US010549998B2

(12) United States Patent
Poulin et al.

(10) Patent No.: US 10,549,998 B2
(45) Date of Patent: Feb. 4, 2020

(54) METHOD AND SYSTEM FOR PRODUCING POLYMER/GRAPHENE OXIDE NANOCOMPOSITES REDUCED BY IN SITU REDUCTION OF GRAPHENE OXIDE

(71) Applicant: Centre National de la Recherche Scientifique, Paris (FR)

(72) Inventors: Philippe Poulin, Talence (FR); Suchithra Padmajan Sasikala, Bordeaux (FR); Cyril Aymonier, Bègles (FR)

(73) Assignee: CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 15/749,749

(22) PCT Filed: Jul. 26, 2016

(86) PCT No.: PCT/EP2016/067847
§ 371 (c)(1),
(2) Date: Feb. 1, 2018

(87) PCT Pub. No.: WO2017/017117
PCT Pub. Date: Feb. 2, 2017

(65) Prior Publication Data
US 2018/0305214 A1    Oct. 25, 2018

(30) Foreign Application Priority Data

Jul. 29, 2015    (FR) ...................................... 15 57277

(51) Int. Cl.
*C01B 32/194* (2017.01)
*C08K 3/04* (2006.01)
(Continued)

(52) U.S. Cl.
CPC .......... *C01B 32/194* (2017.08); *C01B 32/192* (2017.08); *C01B 32/23* (2017.08);
(Continued)

(58) Field of Classification Search
CPC ..... C01B 32/194; C01B 32/23; C01B 32/192; B82Y 30/00; C08L 29/04; C08L 71/02; C08K 3/042
See application file for complete search history.

(56) References Cited

U.S. PATENT DOCUMENTS 5,698,163 A * 12/1997 Mandel .................... B01J 3/008
118/663

OTHER PUBLICATIONS

Li, Chaoqun, et al. "The preparation and properties of polystyrene/functionalized graphene nanocomposite foams using supercritical carbon dioxide." Polymer International 62.7 (2013): 1077-1084.*

(Continued)

*Primary Examiner* — Richard M Rump
(74) *Attorney, Agent, or Firm* — Kenealy Vaidya LLP

(57) ABSTRACT

Some embodiments are directed to a method and device for reducing a component composed of at least one graphene oxide and a matrix consisting of at least one polymer, characterized in that the method includes at least the following steps: introducing a mixture of polymer(s) and graphene oxide GO into a reactor subject to a value of temperature T and a value of pressure P suitable for placing a fluid under supercritical or subcritical conditions for a given period, the temperature T being suitable for not degrading the polymer; and cooling the reactor and removing the obtained product R consisting of reduced polymer(s) and graphene oxide rGO.

11 Claims, 1 Drawing Sheet

(51) Int. Cl.
*C01B 32/23* (2017.01)
*C01B 32/192* (2017.01)
*B82Y 30/00* (2011.01)
*C08L 29/04* (2006.01)
*C08L 71/02* (2006.01)

(52) U.S. Cl.
CPC .............. C08K 3/042 (2017.05); *B82Y 30/00* (2013.01); *C08L 29/04* (2013.01); *C08L 71/02* (2013.01)

(56) References Cited

OTHER PUBLICATIONS

Kim, H. M., et al., "Transparent and high gas barrier films based on poly(vinyl alcohol)/graphene oxide composites," Thin Solid Films 2011;519:7766-7771.

Shao, L., et al., "The effect of the reduction extent on the performance of graphene/poly(vinyl alcohol) composites," J. Mater. Chem. A 2014;2(34):14173-14180.

Li, J., et al., "A novel strategy for making poly(vinyl alcohol)/reduced graphite oxide nanocomposites by solvothermal reduction," Materials and Design 2014;34:520-525.

Toselli, M., et al., "In situ thermal reduction of graphene oxide forming epoxy nanocomposites and their dielectric properties," Polymer Composites 2014;36(2):294-301.

Chang, Y. K., et al., "A Green Approach for Highly Reduction of Graphene Oxide by Supercritical Fluid," Adv. Materials Res. 2014;1004-1005:1013-1016.

International Search Report and Written Opinion for PCT Patent App. No. PCT/EP2016/067847 (dated Oct. 6, 2016) with English language translation of the ISR.

Siyang, L., et al., "Reduced graphene oxide paper by supercritical ethanol treatment and its electrochemical properties," Appl. Surface Sci. 2012;258(13):5299-5303.

\* cited by examiner

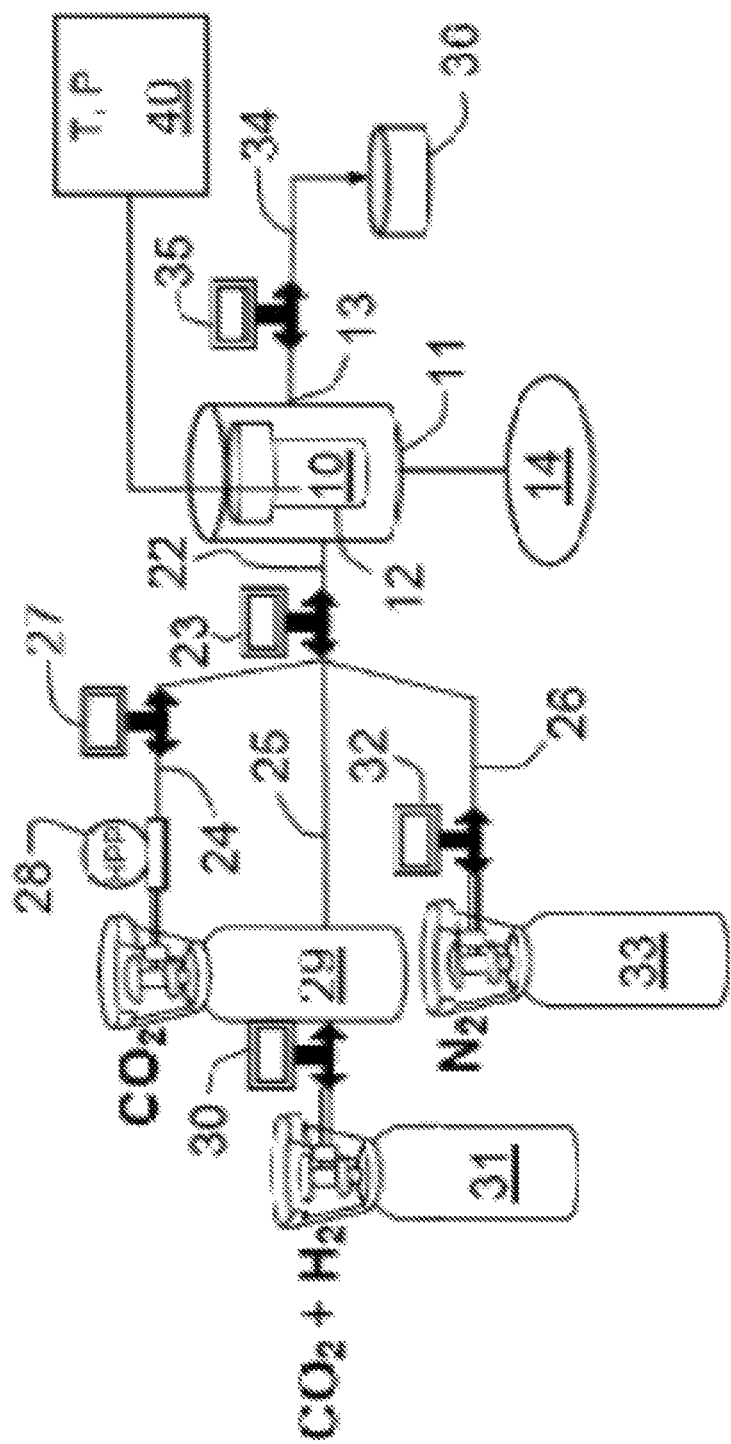

METHOD AND SYSTEM FOR PRODUCING POLYMER/GRAPHENE OXIDE NANOCOMPOSITES REDUCED BY IN SITU REDUCTION OF GRAPHENE OXIDE

CROSS REFERENCE TO RELATED APPLICATIONS

This application is a national phase filing under 35 C.F.R. § 371 of and claims priority to PCT Patent Application No. PCT/EP2016/067847, filed on Jul. 26, 2016, which claims the priority benefit under 35 U.S.C. § 119 of French Patent Application No. 1557277, filed on Jul. 29, 2015, the contents of each of which are hereby incorporated in their entireties by reference.

BACKGROUND

Some embodiments relate to a method and a system which makes it possible in particular to prepare polymer/reduced graphene oxide nanocomposites by in situ reduction of graphene oxide, by using fluids under supercritical and subcritical conditions. It applies generally for the in situ reduction of graphene oxide present in a polymer component in order to obtain a material exhibiting good properties, in particular of electrical conductivity.

Graphene is a material which is difficult to incorporate in polymer matrices. One approach commonly employed for overcoming this difficulty consists in oxidizing graphite in order to form monolayer graphene oxide. Graphene oxide GO, in contrast to graphene, can easily be handled and dissolved in various polar solvents. This ready dissolution of graphene oxide GO makes it possible to produce GO nanocomposites in the form of fibers, films, conductive inks, electrodes and the like. The graphene oxide in these structures is dispersed in a polymer matrix. However, these materials do not exhibit advantageous electrical properties as graphene oxide is an electrical insulator. Thus, the polymer composites containing graphene oxide are not generally used for applications which require a high conductivity or permittivity. It is thus advisable to reduce the graphene oxide in order to form reduced graphene oxide (rGO), which exhibits the property of being conductive. One of the methods known for reducing graphene oxide in a nanocomposite consists in heating the nanocomposite. The efficacy of the reduction increases in proportion as the treatment temperature increases. However, the temperature potentially applicable is limited by a possible decomposition of the polymer matrix. This is because, if an excessively high temperature is used, the graphene oxide will be effectively reduced but the polymer matrix will be decomposed. It is thus advisable to choose a moderate temperature, which generally does not make it possible to obtain a material exhibiting good electrical properties. Consequently, the reduction of the graphene oxide is not very effective and the electrical and dielectric properties of the material obtained are mediocre.

It is known to use "ex situ" reduction methods which include a reduction of the graphene oxide before forming a composite with a polymer. Numerous methods are known for reducing graphene oxide. There thus exist chemical methods based on the use of hydrazine, electrochemical methods, thermal methods with high temperatures and also processes using water under supercritical conditions (SCW for supercritical water).

The publication entitled "Hydrothermal Dehydration for the "Green" Reduction of Exfoliated Graphene Oxide to Graphene and Demonstration of Tunable Optical Limiting Properties" by Yong Zhou and al., Chemistry of Materials, 2009, 21(13), 2950-2956, discloses a hydrothermal dehydration method for converting graphene oxide into a stable reduced graphene oxide (rGO) solution.

The chemical methods consist, for example, in employing reducing agents in a solution of particles of latex and of GO in order to reduce the graphene oxide. The drying of such solutions makes it possible to obtain a polymer-rGO composite. However, such a method requires compatibility between the reducing agents and the polymer.

The patent application EP 2 678 266 describes a method for the production of polymer nanocomposites starting from a dispersion of graphene oxide in a polyurethane latex, followed by a chemical reduction in order to form sheets of reduced graphene oxide. This treatment is rather burdensome since the polymer-reduced GO mixture has to be treated so as to obtain a polymer/rGO composite material.

SUMMARY

Currently, there thus exists a need to have available an efficient method for the in situ reduction of graphene oxide in a nanocomposite having a polymer matrix.

In the continuation of the description, the following definitions are used: The supercritical domain is characterized:
either by a pressure and a temperature which are greater than the critical pressure and temperature of the fluid if it is a pure body,
or, for a mixture of set composition of two or more constituents, by a pressure and a temperature with are greater than the pressure and than the temperature of the critical point of the mixture.

The subcritical conditions are characterized:
either by a pressure which is greater than the critical pressure and a temperature which is lower than the critical temperature of the fluid if it is a pure body,
or, for a mixture of set composition of two or more constituents, by a pressure which is greater than the pressure of the critical point of the mixture and a temperature which is lower than the temperature of the critical point of the mixture.

The method according to some embodiments is based on a novel approach which operates at a moderate temperature under the conditions of supercritical fluids or of subcritical fluids, in order to carry out the in situ reduction of the graphene oxide.

Some embodiments relate to a method for the reduction of at least one graphene oxide within a composite component including at least one polymer matrix, characterized in that it includes at least the following stages:
a) a composite composed of at least one polymer and of graphene oxide GO is introduced into a reactor subjected to a temperature T value and a pressure P value which are appropriate for placing a fluid under supercritical or subcritical conditions for a given period of time, the temperature T being appropriate for not decomposing the polymer,
b) the reactor is cooled and the product R obtained, composed of at least one polymer matrix and of reduced graphene oxide rGO, is withdrawn.

According to an alternative embodiment, carbon dioxide is used as supercritical fluid or as subcritical fluid.

According to another alternative form, a mixture of carbon dioxide and of hydrogen is used as supercritical fluid or as subcritical fluid.

It is also possible to use nitrogen, taken alone or mixed, as supercritical fluid or as subcritical fluid.

The temperature value used for the implementation of some embodiments is, for example, within the interval [100-180° C.] and the chosen pressure value within the interval [20-25 MPa].

The component is, for example, a rGO-PVA composite or a rGO-PEG composite.

Some embodiments are also directed to the product obtained by reduction of a component composed of at least one graphene oxide and of a polymer matrix by carrying out the stages of the method according to some embodiments.

Some embodiments also relate to a device for reducing a composite component composed of a polymer and of graphene oxide, characterized in that it includes at least the following elements:
- a reactor including at least an inlet for a fluid, a discharge outlet and a heating region,
- one or more containers containing one or more fluids chosen for their ability to reach a critical point, the fluids being introduced into the reactor by means of a pipe emerging in the reactor and of a regulating valve,
- a device for heating and pressurizing the reactor containing the fluid and the component in order to carry out the stages of the method according to some embodiments for the reduction of the graphene oxide GO within a component,
- a pressure P and temperature T sensor appropriate for controlling the operating conditions of the reactor.

The device can include a controller for controlling the rise in pressure and temperature of the reactor.

BRIEF DESCRIPTION OF THE EMBODIMENTS

Other characteristics and advantages of some embodiments will become more clearly apparent on reading the description which follows of implementational examples, given by way of illustration and without any limitation, supplemented by the single FIGURE, which represents a diagram of a device for the implementation of the method according to some embodiments.

DETAILED DESCRIPTION OF THE EMBODIMENTS

In the example given to illustrate the method according to some embodiments, a polymer nanocomposite including graphene oxide which can be prepared in different ways, according to known methods of the related art, is considered. A method example will be given without being limiting.

A general method consists first in preparing a polymer nanocomposite with graphene oxide GO which can be easily transformed. The graphene oxide is obtained, for example, by using the Hummers' method known to a person of ordinary skill in the art. In a first step, graphite is oxidized in order to produce graphite oxide, which is subsequently exfoliated using a solvent. This exfoliation results in the formation of monolayer sheets known as graphene oxide. The graphene oxide is subsequently combined with a polymer under temperature conditions lying above the melting point of the polymer for a "melt" compounding. It is also possible to mix it in a common solvent in which the graphene oxide and the polymer are soluble or also in a solvent in which the graphene oxide GO is soluble and in which the polymer is provided in the form of latex particles. The final nanocomposites are obtained, for the first method, by cooling the mixture and, for the final two methods, by coagulating or drying the suspensions. The coagulating can be carried out in order to produce nanocomposite fibers instead of films, or of bulk materials. The amount of graphene oxide GO in the nanocomposite thus obtained can vary from 0% to 20% by weight, using the first method, and from 0% to 100% by weight, using the other two methods. The nanocomposites thus obtained can, if necessary, be treated for given applications, such as: melt spinning, melt extrusion, blowing, 3D printing, and the like.

The materials thus obtained are provided in the form of films, of 3D objects, of coatings, of fibers, and the like. It is these materials which will be reduced in situ under temperature T and pressure P conditions with the assistance of supercritical fluids or of "subcritical" fluids by carrying out the stages according to some embodiments described in detail below, this being done for a set treatment time.

The single FIGURE represents an example of a device which makes it possible to carry out the in situ reduction of a polymer nanocomposite including graphene oxide.

In this example, the device 1 includes a reactor 10 including a heating and pressurizing region 11, in which reactor the polymer-GO (graphene oxide) product to be reduced 2 is placed; the reactor has an inlet 12 which makes possible the introduction of fluids used to reduce the graphene oxide and an outlet 13 which makes possible the discharge of the product R obtained. A device 14 makes possible the heating of the heating region of the reactor.

The inlet 12 is connected to a pipe 22 including a valve 23 for controlling or regulating the passage of the fluids; in this example, the pipe 22 is divided into three pipes 24, 25, 26.

The first pipe 24 includes a first valve 27 for controlling the passage of fluid and a high-pressure pump 28, and it is connected to a container 29 containing a first fluid, for example carbon dioxide $CO_2$.

The second pipe 25 including a second valve 30 for controlling the passage of fluid is connected to a second container 31 containing, for example, a mixture of carbon dioxide and of hydrogen, $CO_2+H_2$, pressurized to a pressure Pg greater than the pressure Pr targeted in the reactor.

The third pipe 26 including a third valve 32 is connected to a third container 33 including a fluid, for example pressurized nitrogen $N_2$.

For $CO_2/H_2$ and $N_2$, use is made, for example, of the pressure of the bottle containing these elements to pressurize the reactor. All the fluids are under pressure.

The outlet 13 is connected to a discharge pipe 34 equipped with a valve 35 for controlling the passage of the reaction gas, which is, for example, stored in a container 36.

The reactor is equipped with a sensor 40 for measuring the temperature T and the pressure P. It is also possible to use separate sensors for the pressure measurement and the temperature measurement. The device according to some embodiments can also be connected to a clock for controlling the treatment duration and/or to a controller which makes it possible to program the introduction of the fluids, their amount, their nature as a function of the nature of the starting material (polymer+GO) and the valves for introduction and discharge of the product obtained after the reaction.

For the implementation of the method, a temperature range $[T_{min}, T_{max}]$ and a pressure interval $[P_{min}, P_{max}]$, and also a treatment time D, are defined.

The minimum operating temperature $T_{min}$ is defined as the value at which the kinetics for reduction of the graphene oxide are significant. The maximum temperature $T_{max}$ will, for example, be defined as the temperature starting from which the polymer decomposes.

The pressure P value within the reactor will be chosen in order to be above the critical point of the fluid or of the mixture of fluids used for the reaction. It is also possible to change the fluid into a supercritical state or into a subcritical state before introducing it into the reactor.

The treatment time can vary, for example, between 10 minutes and 24 hours, preferably between 30 minutes and 3 hours. The treatment time will be chosen in particular as a function of the nature of the components The fluid used for the in situ reduction reaction can be carbon dioxide ($CO_2$, Tc. 31.0° C., Pc. 7.38 MPa), ammonia (Tc. 133.0° C., Pc. 11.4 MPa) or else fluid mixtures under sub- or supercritical conditions with gases, such as nitrogen $N_2$, argon Ar or hydrogen $H_2$, for which the values of the parameters T and P for the supercritical phase depend on the nature of the gas. For example, the critical point of carbon dioxide $CO_2$ is obtained at Tc. 31.0° C., Pc. 7.38 MPa, and that of ammonia at Tc. 133.0° C., Pc. 11.4 MPa.

The method employed within the device described in the single FIGURE includes, for example, the stages described in detail below.

A GO-polyvinyl alcohol (PVA) film is prepared beforehand by dispersing graphene oxide in suspension in water in a concentration of 4 mg/1 ml of water. A series of GO-PVA composites with desired percentages by weight (0.5 to 20 wt % of GO with respect to the PVA) is available, which composites were obtained by mixing graphene oxide and PVA polymer in aqueous solution. The mixture is subsequently "stirred" slowly and homogeneously for at least 5 hours in order to obtain a homogeneous dispersion. The GO-PVA solution thus obtained is poured into a receptacle and subjected to a drying stage at a temperature of 50° C. for 48 hours, in order to obtain a GO-PVA film. The GO-PVA film is placed in the reactor of the single FIGURE, into which a fluid is introduced which can be brought into a supercritical or subcritical state, and the reactor is subjected to a pressure and a temperature which are chosen in order for the fluid to exist in a supercritical state, while not decomposing the polymer. For example, in the case where the fluid is air, nitrogen $N_2$, carbon dioxide $CO_2$, a $CO_2+N_2$ mixture, a $CO_2$+hydrogen $H_2$ mixture, or ammonia, the temperature of the reactor will be brought to a value of between 100° C. and 180° C. and to a pressure within the interv al [200-250 bar] for one hour. The reaction is halted by placing the reactor in a water/ice bath and by opening the outlet valve of the reactor, which makes it possible to recover the product obtained.

In place of a GO-PVA film, it is possible to apply the method to GO-PEG (polyethylene glycol) films including 20% by weight of graphene oxide. The film is introduced into the reactor and reduced in the presence of a supercritical fluid at a temperature of the order of 150° C. and at a pressure of between 20-25 MPa for 3 hours. The supercritical fluid is, for example, carbon dioxide or nitrogen, as was indicated above.

The loading content can be between 0.001 and 99 wt %.

The stages of the method which are set out above also apply when a fluid exhibiting properties which allow it to change into a subcritical state is used.

An example reflecting the effects of the treatment according to some embodiments on the conductivity value for GO-PVA and GO-PEG films is combined in table 1.

TABLE 1

| | | Conductivity, σ, S/m at | | | | | |
| | | Supercritical reactor (capacity 50 ml) | | | | | |
| Condition | Description of the film | Oven | Air | $N_2$ | $CO_2$ | $CO_2 + H_2$ 200 bar | $CO_2 + N_2$ 200 bar |
| --- | --- | --- | --- | --- | --- | --- | --- |
| 150° C./1 h | 10% GO-PVA | 2.09 | 8.45 | 8.72 | 32.06 | 35.13 | 38.03 |
| 180° C./1 h | | 0.737 | 14.90 | 14.06 | 18.71 | 34.89 | 43.18 |

The GO-PVA film is composed of GO and of PVA in the following proportions 10:100 and 20:100 by weight. The treatment effectiveness of the method for the in situ reduction of these films is measured under different supercritical and thermal conditions, in the presence of air/$N_2$/$CO_2$/$CO_2$+$N_2$/$CO_2$+$H_2$, at temperatures of 150°/200° C. and under pressures of the order of 20 MPa in the case of $CO_2$/$CO_2$+$N_2$/$CO_2$+$H_2$. In order to make the comparison, the films were also reduced by conventional heat treatments without using supercritical fluids. The electrical resistance of these films was measured by a two-point method known to a person of ordinary skill in the art, and the electrical conductivity was calculated. The results are given in table 1. Table 1 clearly shows that the treatment for in situ reduction according to some embodiments by using the fluids $CO_2$/$CO_2$+$N_2$/$CO_2$+$H_2$ under supercritical conditions results in an increase in the electrical conductivity in comparison with a heat treatment known from the related art, and without damaging the matrix. This improved electrical conductivity demonstrates a more effective reduction of the reduction of GO to give reduced graphene oxide rGO.

Results obtained by increasing the time for treatment with $CO_2+N_2$, at 150° C. and 25 MPa, are combined in a second table 2.

TABLE 2

| | Conductivity, σ, S/m at | | | |
| | | | Reactor under supercritical conditions with $CO_2 + N_2$, 150° C./200 bar | |
| Description of the film | Treatment time | | | |
| | 1 hr | 3 hr | 1 hr | 3 hr |
| --- | --- | --- | --- | --- |
| 20% GO-PVA | 5.64 | 28.96 | 48.97 | 71.83 |
| 20% GO-PEG | 0.0423 | 0.746 | 7.89 | 29.90 |

Increasing the treatment time has a significant impact on the reduction effectiveness (increase in the electrical conductivity), which shows the effects of the treatment according to some embodiments on the conductivity values of the product obtained for rGO-PVA and rGO-PEG films.

The effect of treatment with subcritical fluid on the conductivity of GO-PVA and GO-PEG films, in comparison with a conventional thermal reduction, is shown in a third table 3.

TABLE 3

| | Conductivity, σ (S/m) | |
| Description of the films | Conventional thermal reduction at 150° C. for 1 hour | Treatment with subcritical fluid $CO_2$ in the presence of $N_2$ at 150° C./55. $10^5$ Pa bar for 1 hour |
| --- | --- | --- |
| 10% GO-PVA | 2.64 | 29.15 |
| 10% GO-PEG | 0.024 | 5.84 |

Table 3

Some embodiments apply in particular to the following composite components: conductive nanocomposites for antistatic materials, conductive nanocomposites for electromagnetic dissipation, organic electronics, flexible electronics, conductive inks, conductive fibers and textiles, electrostrictive nanocomposites for actuators and energy recovery, for example. In addition, the composite can include other reinforcers different in nature from rGO which confer other properties on it.

The method according to some embodiments applies to any type of polymer or polymer mixture exhibiting the property of being able to be partially expanded by a fluid placed under supercritical or subcritical conditions. It is thus possible to envisage organic thermoplastic or thermoset polymers.

In some cases, the method according to some embodiments can be used for ceramic or metallic composites.

Some embodiments in particular provide a method for the in situ reduction of graphene oxide which is more effective than the known methods of the related art.

The method is flexible in that the choice of the fluid(s) and of the sub- or supercritical conditions makes it possible to treat any family of polymers. Furthermore, the method does not require modifications to the methods for the production of composites since it applies just as well to films, fibers and shaped parts. A better reduction of the graphene oxide is obtained in comparison with the conventional treatment, which is reflected by considerable gain in electrical conductivity of the material, while retaining the matrix, in particular polymer matrix.

The method according to some embodiments is environmentally friendly. It does not use chemical agents.

The invention claimed is:

1. A method for the reduction of at least one graphene oxide within a composite component comprising at least one polymer matrix, wherein it comprises at least the following stages:

a composite composed of at least one polymer and of graphene oxide GO is introduced into a reactor subjected to a temperature T value and a pressure P value which are appropriate for placing a fluid under supercritical or subcritical conditions for a given period of time, the temperature T being appropriate for not decomposing the polymer; and the reactor is cooled and the product R obtained, composed of at least one polymer matrix and of reduced graphene oxide rGO, is withdrawn, wherein the temperature value is within the interval [100-180° C.] and the chosen pressure value within the interval [20-25 MPa].

2. The method as claimed in claim 1, wherein carbon dioxide is used as supercritical fluid or as subcritical fluid.

3. The method as claimed in claim 1, wherein a mixture of carbon dioxide and of hydrogen is used as supercritical fluid or as subcritical fluid.

4. The method as claimed in claim 1, wherein nitrogen, taken alone or mixed, is used as supercritical fluid or as subcritical fluid.

5. The method as claimed in claim 1, wherein the component is a rGO-PVA composite.

6. The method as claimed in claim 1, wherein the component is a rGO-PEG composite.

7. The method as claimed in claim 2, wherein the supercritical fluid or as subcritical fluid further comprises nitrogen.

8. The method as claimed in claim 3, wherein supercritical fluid or as subcritical fluid further comprises nitrogen.

9. The method as claimed in claim 2, wherein the component is a rGO-PVA composite.

10. The method as claimed in claim 3, wherein the component is a rGO-PVA composite.

11. The method as claimed in claim 4, wherein the component is a rGO-PVA composite.

* * * * *